United States Patent
Maikawa et al.

(10) Patent No.: US 7,598,692 B2
(45) Date of Patent: Oct. 6, 2009

(54) ELECTRIC POWER CONVERTER, ELECTRIC POWER CONVERTER CONTROLLING METHOD AND ELECTRIC POWER CONVERTING SYSTEM

(75) Inventors: Kengo Maikawa, Yokohama (JP); Kantaro Yoshimoto, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 356 days.

(21) Appl. No.: 11/652,192

(22) Filed: Jan. 11, 2007

(65) Prior Publication Data
US 2007/0159121 A1   Jul. 12, 2007

(30) Foreign Application Priority Data
Jan. 12, 2006   (JP)   ............... 2006-005139

(51) Int. Cl.
   G05F 1/70   (2006.01)
(52) U.S. Cl. ............... 318/438; 318/712; 318/717; 318/729
(58) Field of Classification Search ......... 318/140, 318/727, 729, 799, 801, 438, 712, 717; 322/20
   See application file for complete search history.

(56) References Cited

U.S. PATENT DOCUMENTS

| | | | | |
|---|---|---|---|---|
| 4,344,025 A | * | 8/1982 | Okuyama et al. | ........... 318/729 |
| 4,459,528 A | * | 7/1984 | Nola | ........... 318/729 |
| 4,469,998 A | * | 9/1984 | Nola | ........... 318/729 |
| 5,204,606 A | | 4/1993 | Kuwahara et al. | |
| 5,241,256 A | * | 8/1993 | Hatanaka et al. | ........... 318/801 |
| 5,428,283 A | * | 6/1995 | Kalman et al. | ........... 318/729 |
| 5,561,356 A | * | 10/1996 | Nanos | ........... 318/729 |
| 5,808,880 A | * | 9/1998 | Marvin | ........... 363/37 |
| 6,075,717 A | * | 6/2000 | Kumar et al. | ........... 363/87 |
| 6,636,011 B2 | * | 10/2003 | Sadasivam et al. | ........... 318/727 |
| 6,693,404 B2 | * | 2/2004 | Hiraga et al. | ........... 318/729 |
| 6,828,751 B2 | * | 12/2004 | Sadasivam et al. | ........... 318/729 |
| 7,049,774 B2 | * | 5/2006 | Chin et al. | ........... 318/438 |
| 7,292,004 B2 | * | 11/2007 | Ueda et al. | ........... 318/805 |
| 2006/0091833 A1 | | 5/2006 | Kitajima et al. | |

FOREIGN PATENT DOCUMENTS

| | | |
|---|---|---|
| JP | 2005-031873 | 2/2005 |
| JP | 2005-086973 | 3/2005 |
| JP | 2006-129644 | 5/2006 |
| WO | WO 2005/105511 AL | 11/2005 |

* cited by examiner

*Primary Examiner*—Bentsu Ro
*Assistant Examiner*—Antony M Paul
(74) *Attorney, Agent, or Firm*—Young Basile

(57) ABSTRACT

An electric power converter, electric power converter controlling method and electric power converting system for converting multi-phase alternating-current inputted from a generator and outputting multi-phase alternating current for controlling a drive of a motor. An input power factor commanding section outputs a command value of an input power factor according to an operating condition of the motor, and an input power factor controlling section controls the input power factor of the generator on the basis of the command value of the input power factor from the input power factor commanding section.

17 Claims, 9 Drawing Sheets

|  | Tm* | | | |
|---|---|---|---|---|
|  | $T_1$ | $T_2$ | $T_3$ | .. |
| $\omega_1$ | $\phi_{11}$ | $\phi_{12}$ | $\phi_{13}$ | .. |
| $\omega m$ $\omega_2$ | $\phi_{21}$ | $\phi_{22}$ | $\phi_{23}$ | .. |
| $\omega_3$ | $\phi_{31}$ | $\phi_{32}$ | $\phi_{33}$ | .. |
| . | . | . | . | . |
| . | . | . | . | . |

ELECTRIC POWER CONVERTER, ELECTRIC POWER CONVERTER CONTROLLING METHOD AND ELECTRIC POWER CONVERTING SYSTEM

CROSS-REFERENCE TO RELATED APPLICATION

This application claims priority from Japanese Patent Application Serial No. 2006-005139, filed Jan. 12, 2006, which is incorporated herein in its entirety by reference.

TECHNICAL FIELD

The present invention relates to an electric power converter, electric power converter controlling method and electric power converting system for receiving multi-phase alternating current (AC) and outputting multi-phase current.

BACKGROUND

There are known electric power converters that receive multi-phase alternating-current from a commercial power source and output multi-phase alternating-current for variably driving the speed of an AC motor. For example, Japanese Published Patent Application No. 2002-354815 discloses an electric power converting apparatus, and in particular, a control method of a matrix converter for variably controlling a motor speed using three-phase alternating current as an input.

In that apparatus, it is known to generate a PMW pulse for operating the electric power converting apparatus. An input current command value is calculated from a phase of an input current, a positive-phase-sequence current component and a negative-phase-sequence current component. An input current distribution ratio is calculated from the input current command value. An input power factor is controlled in order to suppress an influence of phase unbalance of the input electric power. Input voltages are detected, and two line voltages are elected from a magnitude relation of the input voltages. Finally, the PWM pulse is calculated from the two line voltages and the input current distribution ratio.

BRIEF SUMMARY OF THE INVENTION

Taught herein are, for example, control units for controlling an electric power converter that receives multi-phase alternating current inputted from a generator and supplies the converted current to a motor. In one example of such a control unit, the control unit comprises an input power factor commanding section operable to output an input power factor command value for an input power factor of the generator according to an operating condition of the motor and an input power factor controlling section operable to output a control signal to the electric power converter, the control signal for controlling the input power factor and based on the input power factor command value.

One example of an electric power converting system taught herein comprises a generator operable to generate multi phase alternating current, a motor driven by the multi phase alternating current, an electric power converter connected to the generator and the motor and a control unit for controlling the electric power converter. The control unit includes an input power factor commanding section operable to generate an input power factor command value for an input power factor of the generator, the input power factor command value based on an operating condition of the motor, and an input power factor controlling section operable to output a control signal to the electric power converter for controlling the input power factor based on the input power factor command value.

Methods for controlling an electric power that receives multi phase alternating current input current from a generator and supplies converted output current to a motor are also taught herein. One such method comprises determining an input power factor command value for the input power factor of the generator, the input power factor command value based on an operating condition of the motor, and outputting a control signal to the electric power converter for controlling the input power factor of the generator based on the input power factor command value.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Although the known apparatus described in Japanese Published Patent Application No. 2002-354815 is capable of executing appropriate control of the output-side motor according to the input voltage, the voltage becomes insufficient when the output-side motor is driven in the high speed range, and a required voltage is raised. This prevents the output-side motor from driving in the high speed range.

In contrast, embodiments of the invention disclosed herein are able to drive an output-side motor in a high speed range under a variety of conditions. According to such embodiments, there are provided an electric power converter, electric power converter controlling method and electric power converting system for converting multi-phase alternating-current inputted from a generator and outputting multi-phase alternating current for controlling a drive of a motor. A command value of an input power factor is output according to an operating condition of the motor, and the input power factor of the generator is controlled on the basis of the command value of the input power factor. Hence, it becomes possible to raise an input voltage of the generator by controlling the input power factor. Accordingly, it is possible to stably supply a required high voltage when the motor operates at high speed.

Hereinafter there are discussed embodiments of the invention in detail based on the drawings. An example of an electric power conversion system is shown as a first embodiment, an example of the electric power conversion system of the first embodiment with a power factor angle correcting section is shown as a second embodiment, an example of the electric power conversion system of the second embodiment with another power factor angle correcting section is shown as a third embodiment, and an example of an electric vehicle system is shown as a fourth embodiment.

Figure 1:
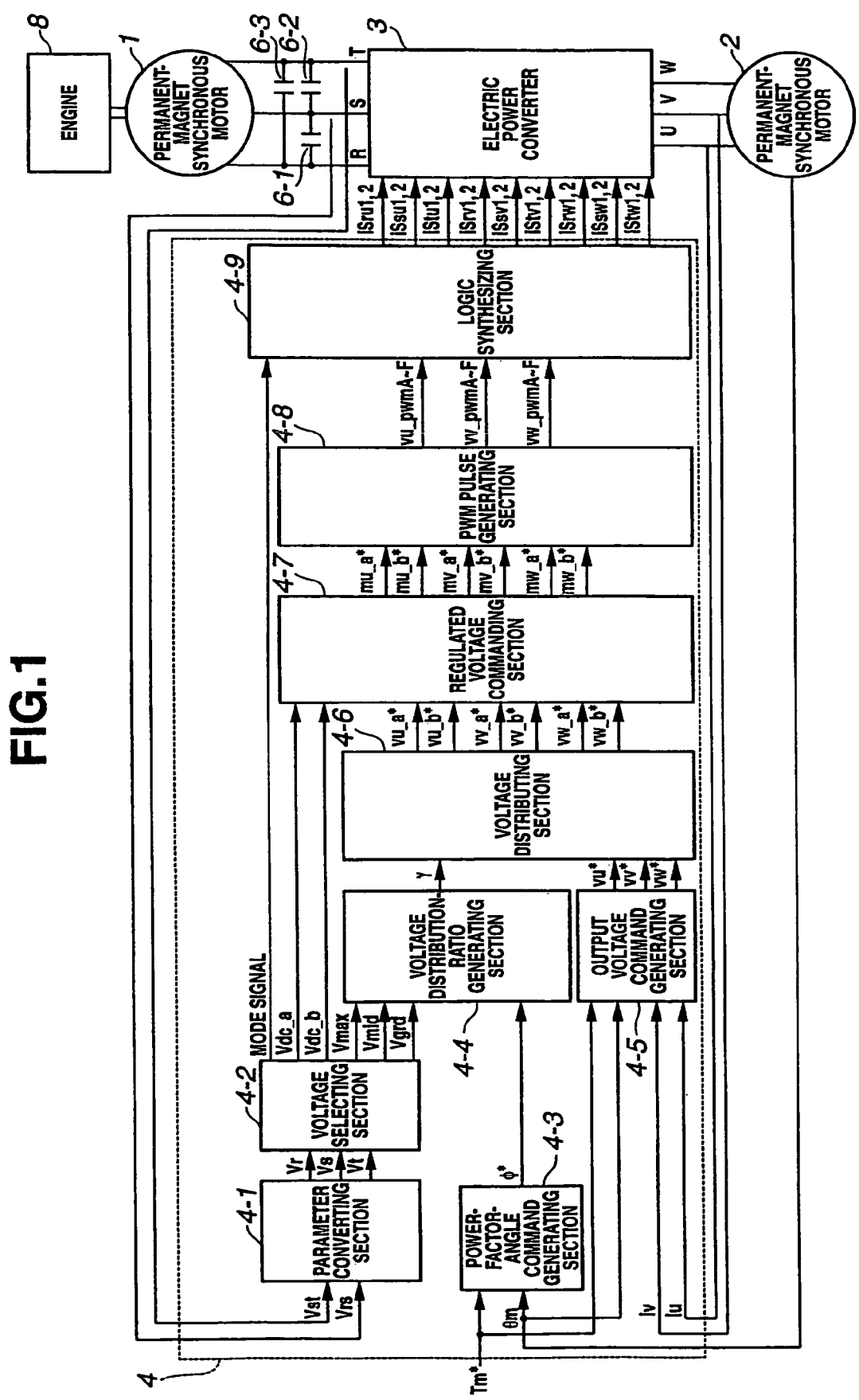
FIG. 1 is a view illustrating an example of hardware of a hybrid electric power conversion system according to a first embodiment of the invention.
Figure 2:
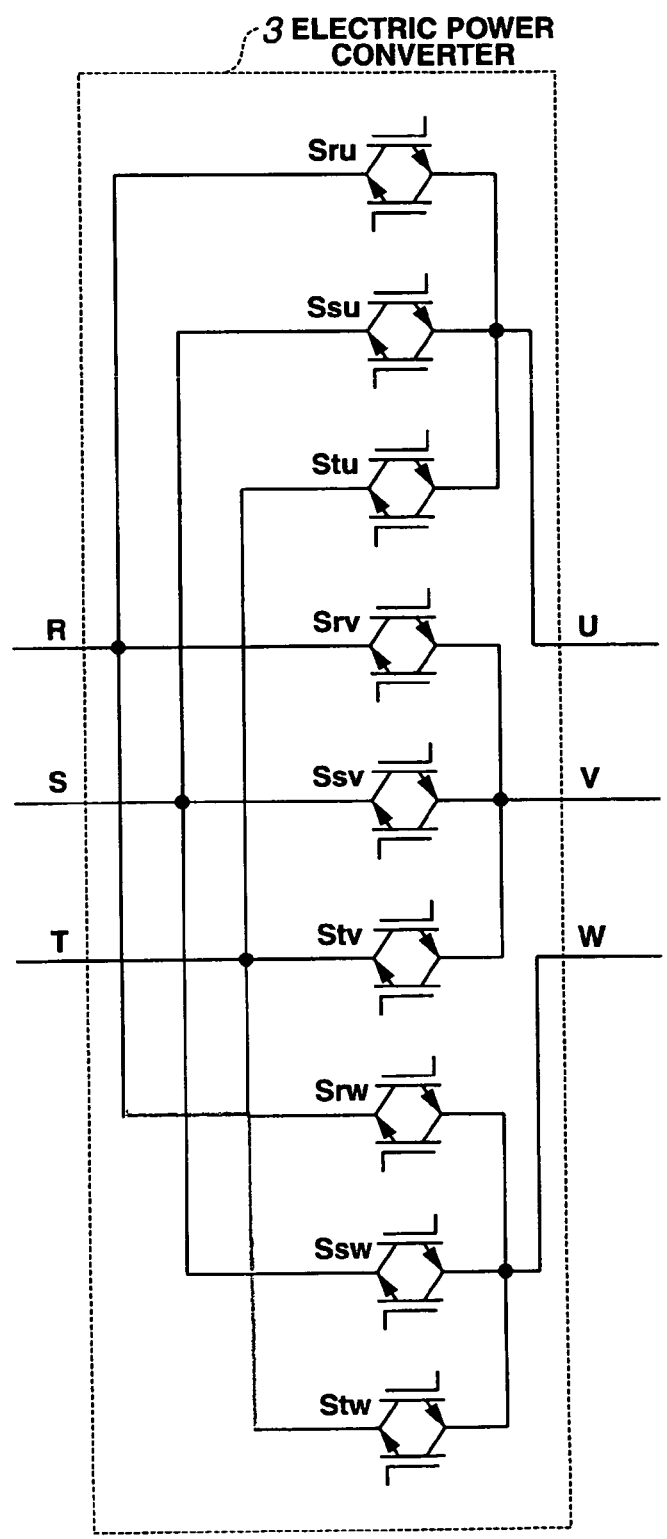
FIG. 2 is a circuit illustrating the electric power converter according to the first embodiment of the invention.

FIG. 1 and FIG. 2 are views explaining an example of hardware of a hybrid electric power conversion system incorporating the electric power converter, electric power converter controlling method and electric power converting system of the invention. In the example shown in FIG. 1, a rotation shaft of a first permanent magnet synchronous motor 1 is mechanically connected to an engine 8. The first permanent magnet synchronous motor 1 and a second permanent magnet synchronous motor 2 are electrically connected to an electric power converter 3. The electric power converter 3 uses R-phase, S-phase and T-phase from the first permanent magnet synchronous motor 1 as inputs. A first capacitor 6-1 is connected between the R-phase input and the S-phase input; a second capacitor 6-2 is connected between the S-phase input and the T-phase input; and a third capacitor 6-3 is connected between the R-phase input and the T-phase input. The electric power converter 3 uses U-phase, V-phase and W-phase of the second permanent magnet synchronous motor 2 as outputs.

Electric power converter 3 constitutes, in this example, a circuit shown in FIG. 2. In FIG. 2, R-phase and U-phase are connected through a switch Sru, S-phase and U-phase are connected through a switch Ssu, T-phase and U-phase are connected through a switch Stu, R-phase and V-phase are connected through a switch Srv, S-phase and V-phase are connected through a switch Ssv, T-phase and V-phase are connected through a switch Stv, R-phase and W-phase are connected through a switch Srw, S-phase and W-phase are connected through a switch Ssw, and T-phase and W-phase are connected through a switch Stw. These arrangements represent hardware of the first embodiment.

Control unit 4 controls the electric power converter 3. As shown in FIG. 1, control unit 4 has a parameter converting section 4-1, a voltage selecting section 4-2, a power factor angle command generating section 4-3, a voltage distribution ratio generating section 4-4, an output voltage command generating section 4-5, a voltage distributing section 4-6, a regulated voltage commanding section 4-7, a PWM pulse generating section 4-8, and a logic synthesizing section 4-9, as will be described in detail herein. The control unit 4, and its sections, or control blocks, can be implemented by a combination of hardware and software. For example, the control unit 4 can be a microprocessor with peripheral components such as memory and input and output connections programmed to perform the various functions of the sections. The microprocessor could be incorporated into a microcontroller. Alternatively, certain functions, such as the generation of PWM pulses could be implemented by an integrated circuit, such as a field-programmable gate array (FPGA). An application-specific integrated circuit (ASIC) is another possible choice to implement the control unit 4 or certain of its sections. Various configurations would be possible as known to those skilled in the art given the description of the functionality of the control unit 4 herein.

Various parameters are received as input and/or produced as output by the respective sections of the control unit 4. In particular, as input to parameter converting section 4-1, Vrs denotes a voltage of R-phase relative to S phase, and Vst denotes a voltage of S phase relative to T phase. As inputs to both power factor angle command generating section 4-3 and output voltage command generating section 4-5, Tm* denotes a torque command of permanent magnet synchronous motor 2, and θm denotes a rotational speed of permanent magnet synchronous motor 2. As further inputs to output voltage command generating section 4-5, iv denotes a V phase current, and iu denotes a U phase current.

Parameters Vr, Vs and Vt denote phase voltages of R-phase, S-phase and T-phase relative to an electrically intermediation point of permanent-magnet synchronous motor 1, respectively, and are output to voltage selecting section 4-2 from parameter converting section 4-1. Outputs from voltage selecting section 4-2 include Mode signal, Vdc_a, Vdc_b, Vmax, Vmid, and Vgrd. Mode signal denotes a signal showing a selected voltage mode and is input to logic synthesizing section 4-9. Parameters Vdc_a and Vdc_b denote input line voltages selected at voltage selecting section 4-2 and are input to regulated voltage commanding section 4-7. Parameters Vmax, Vmid and Vgnd denote a maximum value, an intermediate value and a reference value in R-phase, S-phase and T-phase voltages and are input to voltage distribution ratio generating section 4-4.

Parameter φ* denotes a power factor angle command value, which is output by power factor angle command generating section 4-3 and is input to voltage distribution ratio generating section 4-4. Parameter γ denotes a voltage distribution ratio, which is output by voltage distribution ratio generating section 4-4 to voltage distributing section 4-6. Output voltage command generating section 4-5 passes parameters Vu*, Vv* and Vw*, which denote voltage command values of the U-phase, V-phase and W-phase, respectively, to voltage distributing section 4-6. Voltage command values passed from voltage distributing section 4-6 to regulated voltage commanding section 4-7 are denoted by Vu_a*, Vu_b*, Vv_a*, Vv_b*, Vw_a*, and Vw_b*. Particularly, Vu_a* denotes a voltage command value to U-phase using the line voltage Vdc_a; Vu_b* denotes a voltage command value to U-phase using the line voltage Vdc_b; Vv_a* denotes a voltage command value to V-phase using the line voltage Vdc_a; Vv_b* denotes a voltage command value to V-phase using the line voltage Vdc_b; Vw_a* denotes a voltage command value to W-phase using the line voltage Vdc_a; and Vw_b* denotes a voltage command value to W-phase using the line voltage Vdc_b. Regulated voltage commands passed from regulated voltage commanding section 4-7 to PWM pulse generating section 4-8 are denoted by mu_a*, mu_b*, mv_a*, mv_b*, mw_a* and mw_b*.

Figure 3:
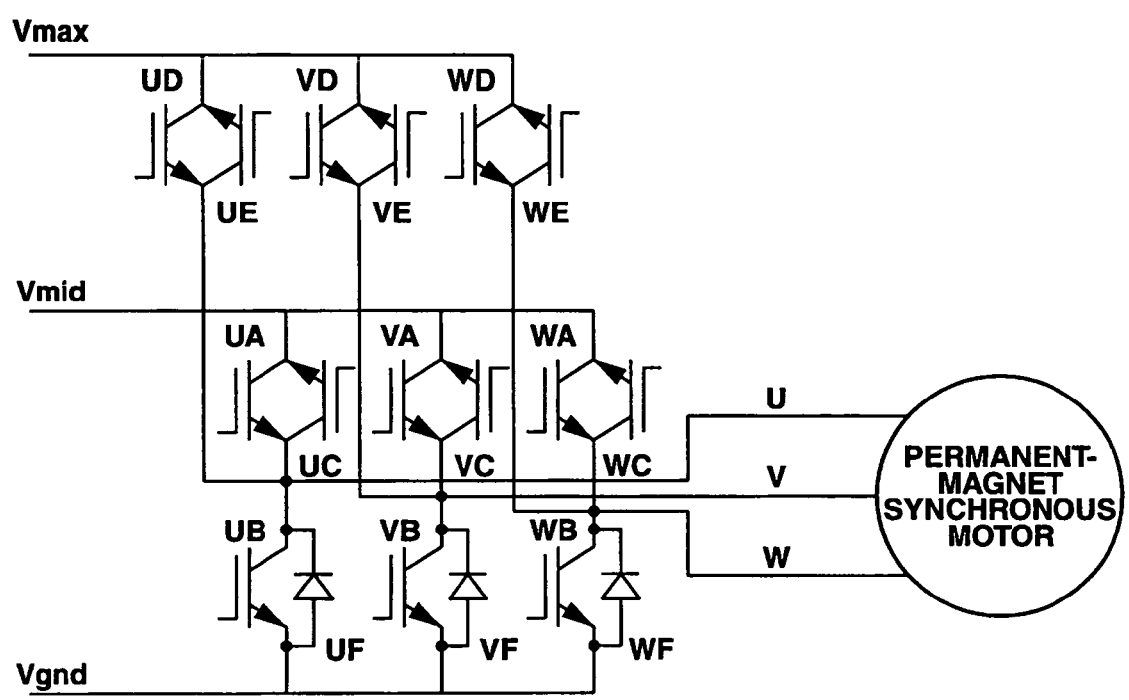
FIG. 3 is a virtual circuit corresponding to the circuit shown in FIG. 2.

The electric power converter 3 may be explained by way of a virtual circuit, shown in FIG. 3, which is equivalent to the circuit shown in FIG. 2. This virtual circuit of the electric power converter uses input line voltages Vdc_a and Vdc_b selected at voltage selecting section 42 as a virtual direct current source, uses U phase, V phase and W phase as inputs and is constituted by virtual switches UA~UF, VA~VF and WA~WF. As this virtual circuit is equivalent to the circuit shown in FIG. 2, the two circuits exhibit corresponding responses to the instantaneous value of the current. In order to easily execute input power factor control, which is discussed later, the control is executed by setting the virtual circuit to supply electric power from the two virtual current sources $Vdc_{13}a$ and $Vdc_{13}b$ to one of motors 1 and 2.

Continuing the explanation of the parameters by again referencing FIG. 1, Vu_pwmA~F, which is passed from the PWM pulse generating section 4-8 to the logic synthesizing section 4-9, is comprised of Vu_pwmA, Vu_pwmB, Vu_pwmC, Vu_pwmD, Vu_pwmE and Vu_pwmF, which are U-Phase PWM pulses that determine the opening/closing state of virtual switches UA, UB, UC, UD, UE and UF, respectively. Similarly, PWM pulses of V-phase and W-phase are denoted by Vv_pwmA~F and Vw_pwmA~F, respectively, in similar manner to Vu_pwmA~F as discussed above. As outputs of logic synthesizing section 4-9, iSru1, iSsu1, iStu1, iSrv1, iSsv1, iStv1, iSrw1, iSsw1, and iStw1 denote PWM pulses determining the opening/closing states of respective switches Sru1, Ssu1, Stu1, Srv1, Ssv1, Stv1, Srw1, Ssw1, and Stw1 shown in FIG. 2. Similarly, iSru2 through iStw2 denote PWM pulses determining the opening/closing states of respective switches in a similar manner to that described in connection with iSru2 through iStw2.

Figure 4:
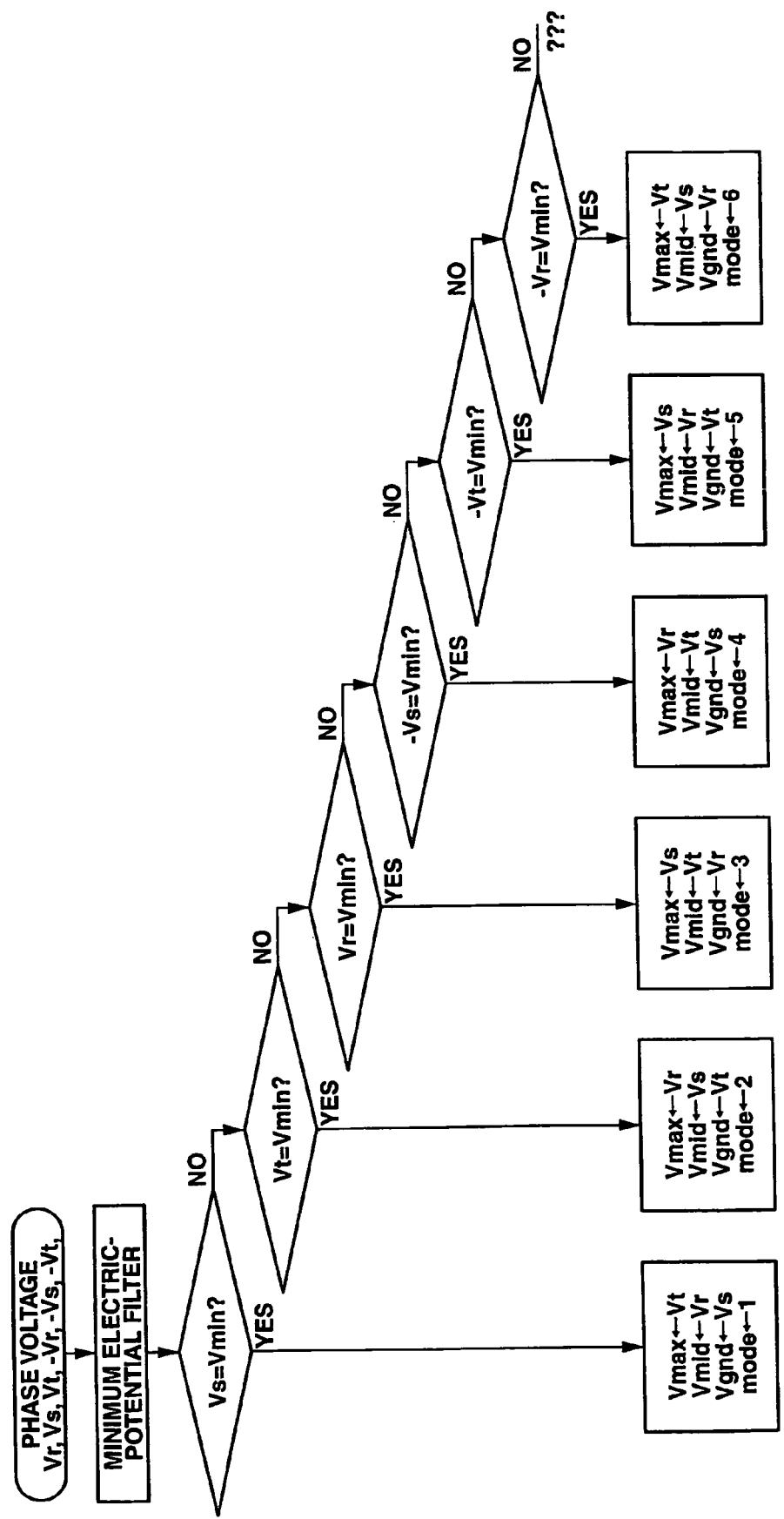
FIG. 4 is a flowchart showing an example of a selecting operation executed by a voltage selecting section according to the first embodiment of the invention.

Next, control blocks 4-1 though 4-9 are described starting with control block 4-1. Parameter converting section 4-1 receives Vrs and Vst, executes a parameter conversion thereof and provides Vr, Vs and Vt as outputs. Parameters Vr, Vs and Vt are calculated according to the following expressions:

$Vr = -\frac{1}{3} \cdot (-Vst - 2Vrs);$ $Vs = -\frac{1}{3} \cdot (Vrs - Vst);$ and $Vt = -\frac{1}{3} \cdot (2Vst + Vrs).$ Voltage selecting section 4-2 receives Vr, Vs and Vt, executes a selection of the voltages from the inputted voltages and outputs Vmax, Vmid, Vgnd, Vdc_a, Vdc_b and a Mode signal. As a method of selecting voltage, Vmax, Vmid, Vgnd, and Mode signal are selected by executing a process such as that in the flowchart shown in FIG. 4. A minimum voltage filter sets a parameter Vmin equal to the minimum voltage present among Vr, Vs, Vt, -Vr, -Vs and -Vt. Parameters Vdc_a and Vdc_b are calculated on the basis of the following expressions:

$Vdc\_a = Vmax - Vgnd;$ and $Vdc\_b = Vmid - Vgnd.$

Figures 5, 6:
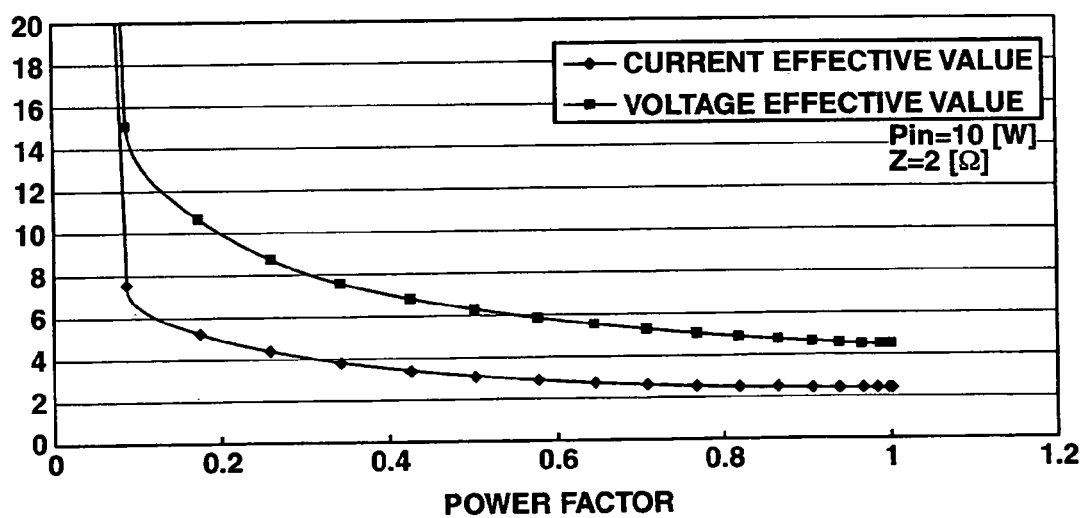
FIG. 5 is an example of a map employed by a power factor angle generating section according to the first embodiment of the invention.
FIG. 6 is a graph showing a relationship among a power factor, an input voltage effective value and an input current effective value according to the first embodiment of the invention.

Power factor angle command generating section 4-3 receives Tm* and θm and outputs an appropriate power factor angle command φ* using a lookup table or the like. The lookup table, or map, shown in FIG. 5 shows a relationship between Tm* and ωm obtained by temporal differentiation of output side revolution speed θm. Herein, there is discussed a method of deriving the appropriate power factor angle command φ*. Firstly, two preconditions of the method are as follows. All of the electric power generated by an electric power conversion system is electric power generated by permanent magnet synchronous motor 1. In case that all of the electric power is consumed in the electric power conversion system, the two preconditions are that:

1. input-side average generated power energy Pin is determined by output-side average generated power energy Pout; and
2. when the power factor is changed while input-side generated power energy Pin is constant, an input voltage effective value (root-mean-square value) and input current effective value (root-mean-square value) are changed as shown in FIG. 6.

The foregoing preconditions merit additional explanation. As to the first precondition, the hybrid system is arranged such that electric power necessary for the output side is generated by an input side permanent magnet synchronous motor. Accordingly, in this system an absolute value of the input side average generated power energy Pin becomes equal to an absolute value of the output side average consumed power energy. Subsequently, as to the second precondition, the average generated power energy Pin is expressed as a product of an effective value Irms of the input AC current, an effective value Vrms of the input AC voltage and the power factor cos φ, as follows:

$$Pin = Irms \cdot Vrms \cdot \cos\phi. \quad (1)$$

Invalid quantity (reactive power) Pin_var of the input electric power is represented as follows:

$$Pin\_var = Irms \cdot Vrms \cdot \sin\phi. \quad (2)$$

Apparent power Pin_a is represented as follows:

$$Pin\_a = Irms \cdot Vrms = \sqrt{Pin^2 + Pin\_var^2}. \quad (3)$$

If an input impedance is Z, Irms and Vrms establish the following relationship:

$$Vrms = Z \cdot Irms. \quad (4)$$

FIG. 6 shows a relationship among the power factor, the input voltage effective value and the input current effective value obtained based on expressions (1) and (4). When the input power factor approaches 0, the input voltage is increased. When the input power factor approaches 1 (i.e., unity), the input current is decreased.

It is preferable to use a graph like that shown in FIG. 6 for each output electric power to obtain an appropriate input power factor angle command φ*. For example, when the output side permanent magnet synchronous motor rotates at high speed, an induction voltage generated by a permanent magnet of the motor becomes high, and therefore the input side voltage also becomes high. Accordingly, the power factor angle command value is set such that the input voltage becomes high. When it is not necessary to set the output side voltage at a high value, the power factor is set at a value near 1 so as to further effectively generate electric power. That is, the power factor is selected so as to generate a required voltage at the output side and to minimize the input current. On the basis of the above-discussed principle, the appropriate power factor angle command value φ* is obtained.

Voltage distribution ratio generating section 4-4 receives φ*, Vmax, Vmid and Vgnd as inputs and outputs an appropriate voltage distribution ratio γ, which is used to correct the input power factor. Herein, voltage distribution ratio γ represents a power source load rate of the virtual direct-current (DC) power sources Vdc_a and Vdc_b in the virtual circuit of FIG. 3. The input power factor angle command φ* and the voltage distribution ratio γ establish the following relationship, and γ is calculated on the basis of the following expression:

$$\gamma = \frac{\left\{ V_{max} \cdot \cos\phi^* - \frac{1}{\sqrt{3}}(V_{mid} - V_{gnd}) \cdot \sin\phi^* \right\} \cdot (V_{max} - V_{gnd})}{\left\{ V_{max} \cdot \cos\phi^* - \frac{1}{\sqrt{3}}(V_{mid} - V_{gnd}) \cdot \sin\phi^* \right\} \cdot (V_{max} - V_{gnd}) - \left\{ V_{mid} \cdot \cos\phi^* - \frac{1}{\sqrt{3}}(V_{gnd} - V_{max}) \cdot \sin\phi^* \right\} (V_{mid} - V_{gnd})}$$

Returning to FIG. 1, output voltage command generating section 4-5 receives measured current values iu and iv of permanent magnet synchronous motor 2, revolution speed θm of permanent magnet synchronous motor 2 and the torque command tm* of permanent magnet synchronous motor 2, and outputs the respective phase voltages Vu*, Vv* and Vw* required by permanent magnet synchronous motor 2. The voltages Vu*, Vv* and Vw* are calculated on the basis of the PI control and the vector calculation.

Voltage distribution section 4-6 receives γ, Vu*, Vv* and Vw* and outputs Vu_a*, Vu_b*, Vv_a*, Vv_b*, Vw_a* and Vw_b*. Voltage command values Vu_a*, Vu_b*, Vv_a*, Vv_b*, Vw_a* and Vw_b* are calculated by voltage distribution section 4-6 on the basis of the following expressions:

$$Vu\_a^* = \gamma \cdot Vu^*;$$

$$Vu\_b^* = (1-\gamma) \cdot Vu^*;$$

$$Vv\_a^* = \gamma \cdot Vv^*;$$

$$Vv\_b^* = (1-\gamma) \cdot Vv^*;$$

$$Vw\_a^* = \gamma \cdot Vw^*;\ \text{and}$$

$$Vw\_b^* = (1-\gamma) \cdot Vw^*.$$

Regulated voltage commanding section 4-7 receives Vu_a*, Vu_b*, Vv_a*, Vv_b*, Vw_a*, Vw_b*, Vdc_a and Vdc_b and outputs mu_a*, mu_b*, mv_a*, mv_b*, mw_a* and mw_b*. Regulated voltage commands mu_a*, mu_b*, mv_a*, mv_b*, mw_a* and mw_b* are calculated by regulated voltage commanding section 4-7 on the basis of the following expressions:

$$mu\_a^* = Vu\_a^*/(2 \cdot Vdc\_a);$$

$$mu\_b^* = Vu\_b^*/(2 \cdot Vdc\_b);$$

$$mv\_a^* = Vv\_a^*/(2 \cdot Vdc\_a);$$

$$mv\_b^* = Vv\_b^*/(2 \cdot Vdc\_b);$$

$$mw\_a^* = Vw\_a^*/(2 \cdot Vdc\_a);\ \text{and}$$

$$mw\_b^* = Vw\_b^*/(2 \cdot Vdc\_b).$$

The PWM pulse generating section 4-8 receives mu_a*, mu_b*, mv_a*, mv_b*, mw_a* and mw_b* as inputs and outputs Vu_pwmA~Vu_pwmF, Vv_pwmA~Vv_pwmF, and Vw_pwmA~Vw_pwmF by means of a conventional triangular wave comparing method. It is also possible to utilize a method disclosed in U.S. patent application Ser. No. 11/174,643, and published as United States Patent Application Publication No. US 2006-0006832 A1, which is incorporated herein in its entirety by reference and which is assigned to the assignee of this invention.

Logic synthesizing section 4-9 receives Vu_pwmA~Vu_pwmF, Vv_pwmA~Vv_pwmF, Vw_pwmA~Vw_pwmF and Mode signal as inputs and outputs iSru1~iStw2. Vu_pmwA~Vw_pwmF are allocated to iSru1~iStw2 by each mode on the basis of the following TABLE 1. In TABLE 1, Vu_pwmA~Vu_pwmF, Vv_pwmA~Vv_pwmF, and Vw_pwmA~Vw_pwmF are represented by UA~UF, VA~VF, and WA~WF, respectively, wherein, by way of example, UA represents Vu_pwmA, and UB represents Vu_pwmB.

TABLE 1

| SWITCH | mode ① | ② | ③ | ④ | ⑤ | ⑥ |
|---|---|---|---|---|---|---|
| iSru1 | UD | UA | UF | UE | UC | UB |
| iSru2 | UE | UC | UB | UD | UA | UF |
| iSsu1 | UF | UD | UA | UB | UE | UC |
| iSsu2 | UB | UE | UC | UF | UD | UA |
| iStu1 | UC | UB | UE | UA | UF | UD |
| iStu2 | UA | UF | UD | UC | UB | UE |
| iSrv1 | VD | VA | VF | VE | VC | VB |
| iSrv2 | VE | VC | VB | VD | VA | VF |
| iSsv1 | VF | VD | VA | VB | VE | VC |
| iSsv2 | VB | VE | VC | VF | VD | VA |
| iStv1 | VC | VB | VE | VA | VF | VD |
| iStv2 | VA | VF | VD | VC | VB | VE |
| iSrw1 | WD | WA | WF | WE | WC | WB |
| iSrw2 | WE | WC | WB | WD | WA | WF |
| iSsw1 | WF | WD | WA | WB | WE | WC |
| iSsw2 | WB | WE | WC | WF | WD | WA |
| iStw1 | WC | WB | WE | WA | WF | WD |
| iStw2 | WA | WF | WD | WC | WB | WE |

Since the present invention according to the first embodiment is arranged to comprise the means for selecting an input power factor by which the required voltage is supplied at the output side, and the input current is decreased, it is possible to stably apply a sufficient voltage against a high induction voltage of the permanent magnet motor, and therefore it becomes possible to drive the output side motor at high speed. Further, since the change of the input power factor is achieved by changing the voltage distribution ratio γ of the virtual circuits, it is possible to modify the input power factor by a small calculation quantity. Furthermore, since an operation of increasing the input voltage requires no reactor and no converter, the cost is decreased by a cost of a reactor and a converter. Since iron loss and copper loss of the reactor and converter loss are not generated, it also becomes possible to produce a low-loss system. Since Mode signal, voltage distribution ratio γ and the regulated voltage command are determined on the basis of the input voltages, the motors and the input currents are stably controlled even when the input voltages fluctuate. Further, the synthetic pulse is produced by a table relating the virtual voltage pulse and the actual circuit switch on the basis of Mode signal. Accordingly, the circuit of FIG. 3, which is constructed by the virtual switches, is produced by each mode. Therefore, the short-circuit pattern and the opened pattern are limited, and this is advantageous in malfunction diagnosis and the maintenance.

Figure 7:
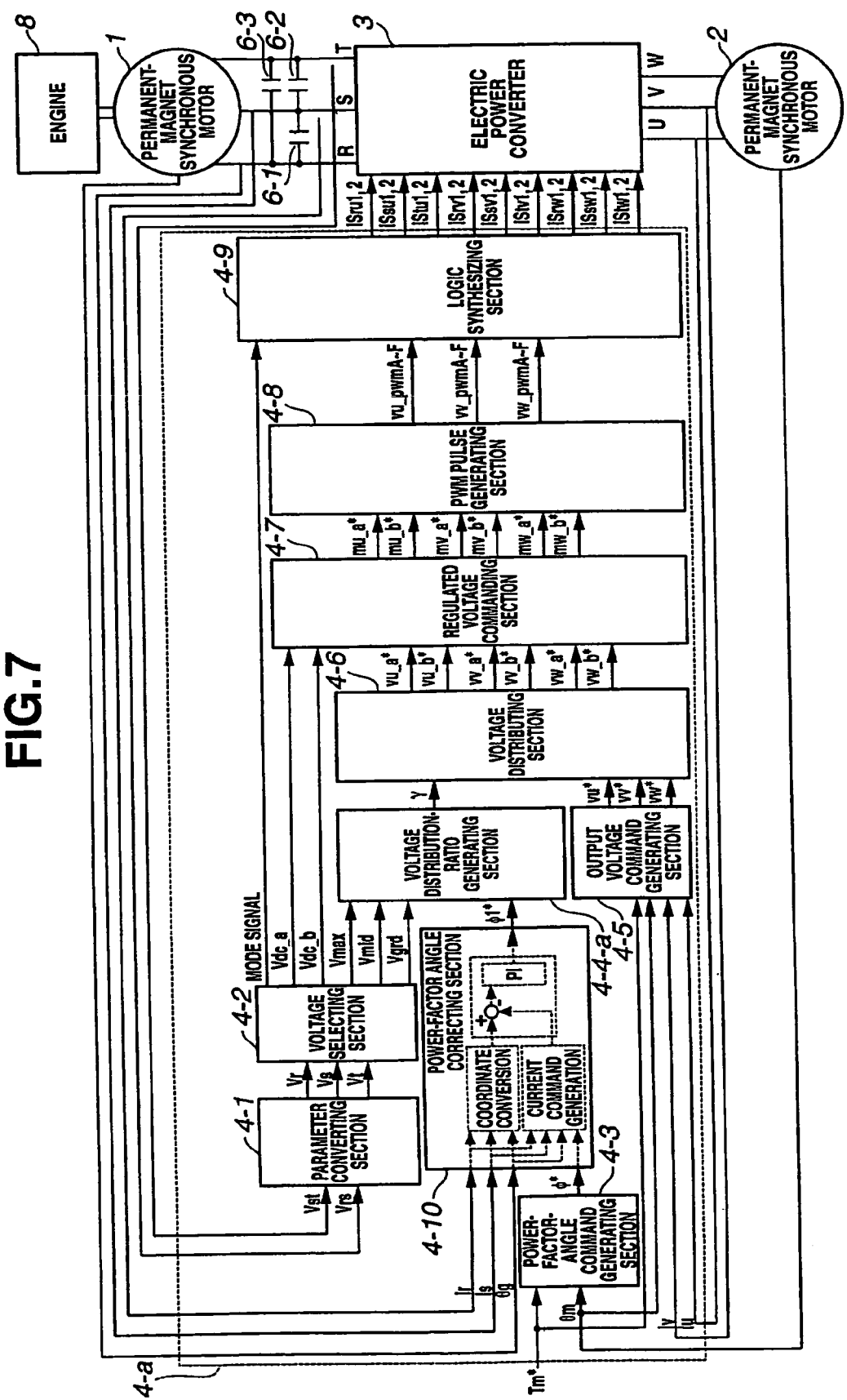
FIG. 7 is a view illustrating another example of hardware of the hybrid electric power conversion system according to a second embodiment of the invention.

There is shown a second embodiment in FIG. 7 The second embodiment is arranged to further comprise a block 4-10 for correcting the power factor angle command φ* of the first embodiment so as to further accurately control the input power factor.

More specifically, FIG. 7 shows hardware according to the second embodiment. In like manner as discussed in connection with the first embodiment, a rotation shaft of first permanent magnet synchronous motor 1 is mechanically connected to engine 8. Electric power converter 3 uses R-phase, S-phase and T-phase of the first permanent magnet synchronous motor 1 as inputs, and U-phase, V-phase and W-phase of the second permanent magnet synchronous motor 2 as outputs. Capacitors 6-1, 6-2 and 6-3 are connected to the inputs of the electric power converter 3 as described in connection with the first embodiment.

Control of the second embodiment is discussed on the basis of the control unit 4-*a* in FIG. 7, which is connected to the electric power converter 3 and the motors 1, 2. Blocks 4-1~4-3 and 4-5~4-9 are the same as those in the first embodiment, and therefore the explanat thereof is omitted. Only voltage distribution ratio generating section 4-4-a and power factor angle correcting section 4-10 will be discussed.

Figure 8:
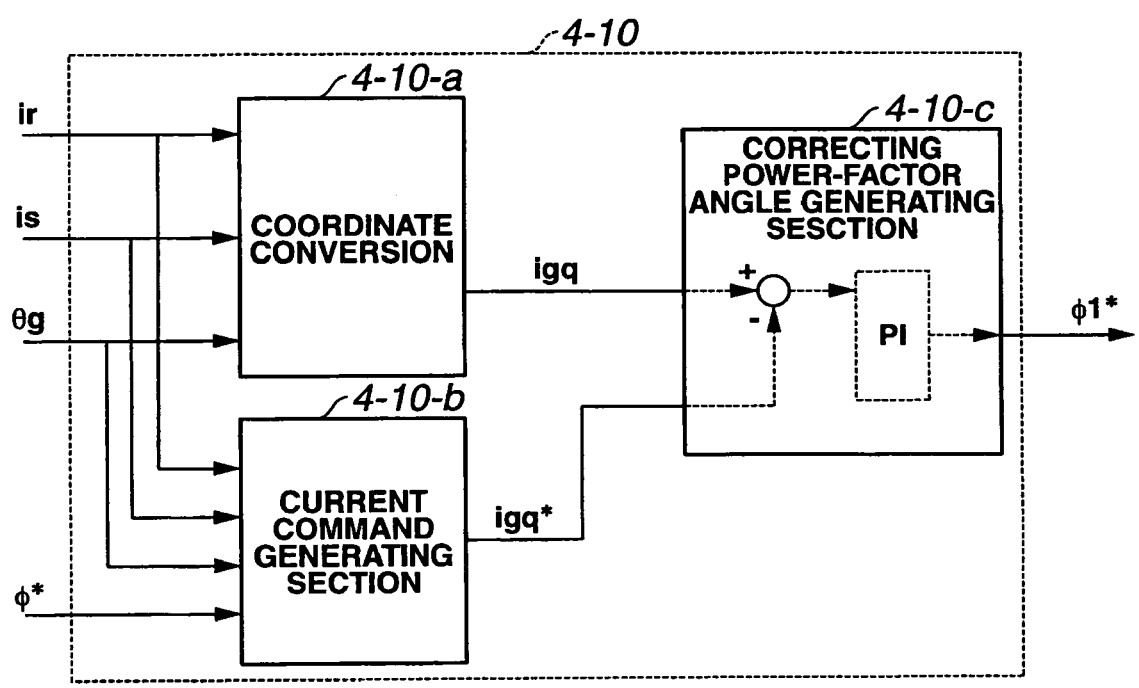
FIG. 8 is a block diagram illustrating an example of a power factor angle correcting section according to the second embodiment of the invention.

Power factor angle correcting section 4-10 receives input phase currents ir and is, input side rotational angle position θg and power factor angle command φ* as inputs. Based on these inputs, power factor angle correcting section 4-10 corrects the power factor angle command by the feedback of the input current and outputs the corrected power factor angle command φ1*. Power factor angle correcting section 4-10 includes a coordinate converting section 4-10-a, a power factor angle correction value generating section 4-10-b and a corrected power factor angle generating section 4-10-c as shown in FIG. 8. Hereinafter, an explanation thereof will be made of these control blocks.

Coordinate converting section 4-10-a receives ir, is and θg as inputs, converts ir and is into coordinates synchronized with θg, and outputs a current igq synchronized with θg. In this manner, igq is calculated as follows:

$$igq = -\sqrt{(2/3)}\{Ir \sin θg + Is \sin(θg - 2/3π) + (-ir-is)\sin(θg + 2/3π)\}.$$

Current command value generating section 4-10-b receives ir, is and θg as inputs and generates a current command value igq*. Current command value igq* is calculated according to the following expression:

$$Igq^* = I \cdot \sin(-φ^*);$$

wherein $$I = \sqrt{(igq^2 + igd^2)}; \text{ and}$$

$$Igd = \sqrt{(2/3)}\{Ir \cos θg + Is \cos(θg - 2/3π) + (-ir-is)\cos(θg + 2/3π)\}.$$

Corrected power factor angle generating section 4-10-c receives igq and igq* as inputs and outputs power factor command φ1* by executing the PI control.

Voltage distribution ratio generating section 4-4-a generates a voltage distribution ratio with respect to the corrected power factor angle command φ1* on the basis of the following expression:

$$\gamma = \frac{\left\{V_{max} \cdot \cos φ1^* - \frac{1}{\sqrt{3}}(V_{mid} - V_{gnd}) \cdot \sin φ1^*\right\} \cdot (V_{max} - V_{gnd})}{\left\{V_{max} \cdot \cos φ1^* - \frac{1}{\sqrt{3}}(V_{mid} - V_{gnd}) \cdot \sin φ1^*\right\} \cdot (V_{max} - V_{gnd}) - \left\{V_{mid} \cdot \cos φ1^* - \frac{1}{\sqrt{3}}(V_{gnd} - V_{max}) \cdot \sin φ1^*\right\}(V_{mid} - V_{gnd})}$$

Since the power factor angle correcting section 4-10 is added, and the control is executed while the change of the input current is compensated by the feedback of the input current, the input current is further accurately controlled. Therefore, it is possible to increase the effects of increasing the revolution speed of the motor, making the motor more efficient and decreasing losses.

Figure 9:
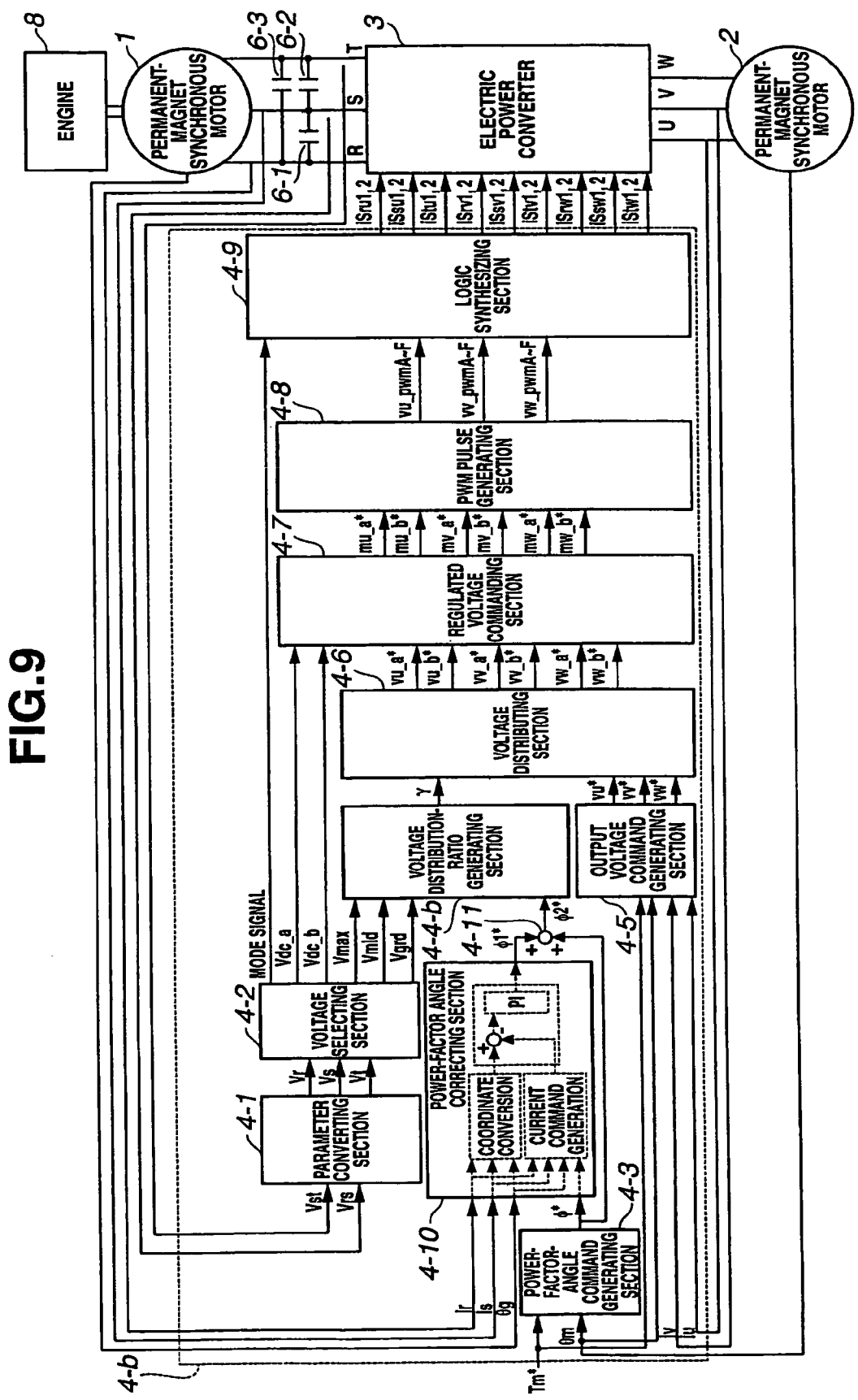
FIG. 9 is a view illustrating another example of hardware of the hybrid electric power conversion system according to a third embodiment of the invention.

A third embodiment of the hybrid electric power system in FIG. 9 incorporates the power factor angle correcting section 4-10. This constitution further improves the responsiveness of the input power factor by applying a correction that adds the power factor angle command φ* to the power angle command φ1* of the second embodiment.

FIG. 9 shows hardware according the third embodiment. In like manner as discussed in connection with the first and second embodiments, the third embodiment has rotation shaft of the first permanent magnet synchronous motor 1 mechanically connected to engine 8. Electric power converter 3 uses the R-phase, S-phase and T-phase of the first permanent magnet synchronous motor 1 as inputs and uses the U-phase, V-phase and W-phase of second permanent magnet synchronous motor 2 as outputs. Capacitors 6-1, 6-2 and 6-3 are connected to the inputs of the electric power converter 3 as described in connection with the first embodiment.

Control of the third embodiment is described herein in connection with a control unit 4-b shown in FIG. 9. Control unit 4-b is connected to electric power converter 3 and motors 1, 2. Herein, an explanation is made only as to an adder 4-11 and a voltage distribution ratio generating section 4-4-b, which are changed sections from those of the second embodiment.

Adder 4-11 generates a corrected power factor angle command φ2* by adding the power factor angle command φ* to the power angle command φ1*.

Voltage distribution ration generating section 4-4-b generates a voltage distribution ratio with respect to the correcting power factor angle command φ2* on the basis of the following expression:

$$\gamma = \frac{\left\{V_{max} \cdot \cos φ2^* - \frac{1}{\sqrt{3}}(V_{mid} - V_{gnd}) \cdot \sin φ2^*\right\} \cdot (V_{max} - V_{gnd})}{\left\{V_{max} \cdot \cos φ2^* - \frac{1}{\sqrt{3}}(V_{mid} - V_{gnd}) \cdot \sin φ2^*\right\} \cdot (V_{max} - V_{gnd}) - \left\{V_{mid} \cdot \cos φ2^* - \frac{1}{\sqrt{3}}(V_{gnd} - V_{max}) \cdot \sin φ2^*\right\}(V_{mid} - V_{gnd})}$$

With the arrangement of the third embodiment, by adding the power factor angle command φ* to the power factor angle command φ1* by means of the feedforward, it becomes possible to control the input power factor at high speed and to respond to a sharp change of the torque command, in addition to the merits of the first and second embodiments.

Figure 10:
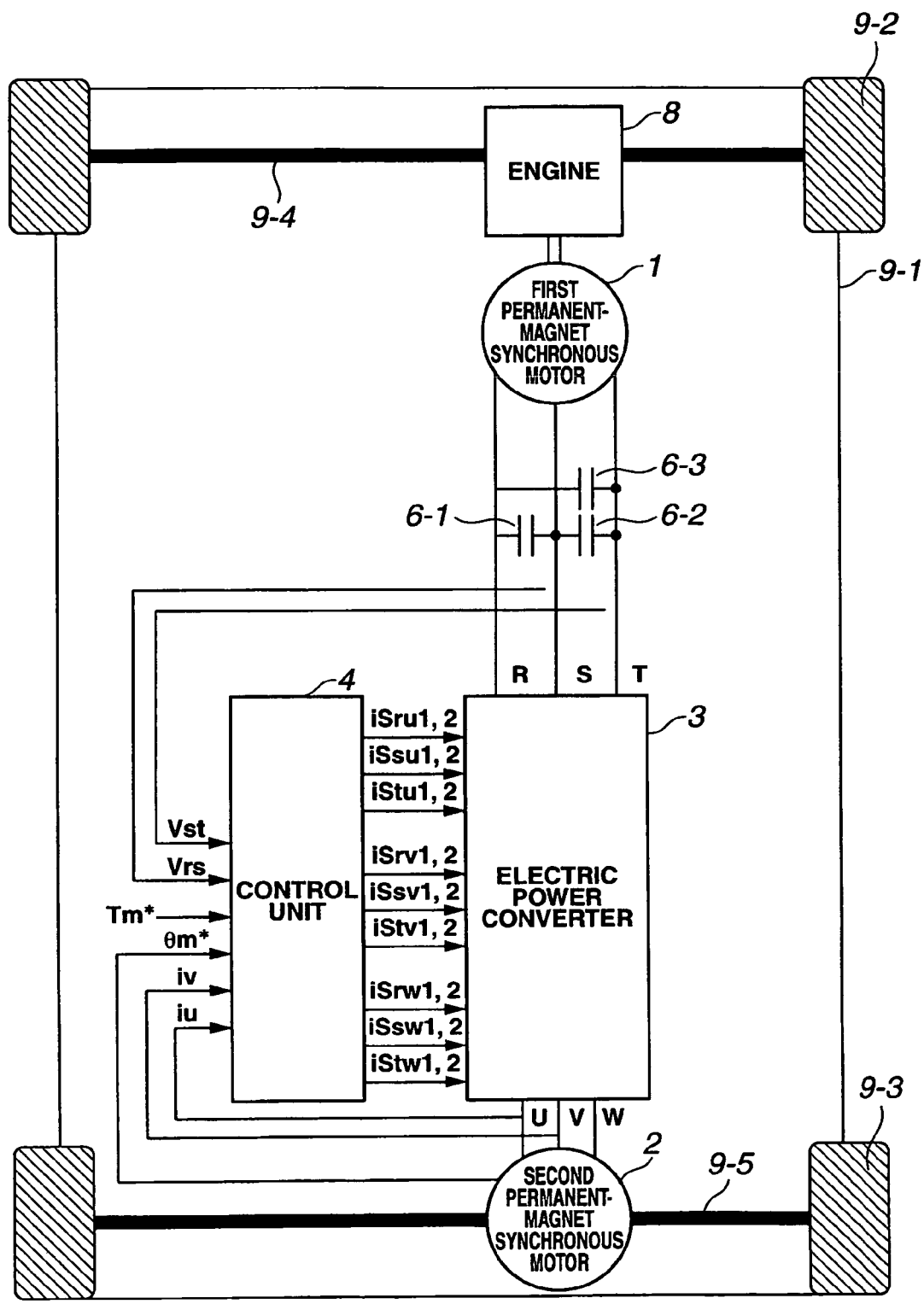
FIG. 10 is a view illustrating an example of hardware of an electric vehicle system according to a fourth embodiment of the invention.

There is next shown an electric vehicle system as a fourth embodiment in FIG. 10. The electric vehicle is arranged to adapt the first, second and third embodiments to an electric vehicle and to allow four-wheel-drive operation of the electric vehicle using the energy of the motors and the energy of the engine. As shown in FIG. 10, a rotation shaft of first permanent magnet synchronous motor 1 is mechanically connected to an engine 8. First permanent magnet synchronous motor 1 and second permanent magnet synchronous motor 2 are electrically connected to electric power converter 3. Electric power converter 3 uses R-phase, S-phase and T-phase as inputs and U-phase, V-phase and W-phase as outputs. A first capacitor 6-1 is connected between the R-phase and the S-phase; a second capacitor 6-2 is connected between the S-phase and the T-phase; and a third capacitor 6-3 is connected between the R-phase and the T-phase. Control unit 4 is shown, but control unit 4-a or 4-b could be used.

Also shown in FIG. 10, reference numeral 9-1 denotes a vehicle body. Reference numeral 9-2 denotes front wheels. Reference numeral 9-3 denotes rear wheels. Reference numeral 9-4 denotes a front-wheel drive shaft, which transmits a driving force of the engine to the front wheels. Reference numeral 9-5 denotes a rear-wheel drive shaft, which transmits a driving force of the permanent magnet synchronous motor 2 to the rear wheels.

With the fourth embodiment it is possible to control the power factor of the motor connected to the engine at high speed and with high accuracy by applying the power factor control of the first, second and third embodiment to the electric vehicle. It is also possible to control the voltage and the current of the motor by means of this control.

Embodiments of the invention are suitable for use in a hybrid vehicle and the electric power converting system equipped in an electric vehicle discussed in the first and fourth embodiments. In these hybrid vehicles, all of electric power generated by the electric power converting system is electric power generated by the permanent magnet synchronous motor 1 and is consumed in the electric power converting system. Therefore, it is possible to utilize the input power factor discussed in the first through third embodiments in the control. More specifically, since it is possible to raise the voltage without increasing the revolution speed of the engine for driving the generator, this system has an advantage. Further, since it becomes possible to utilize a high-speed operating range of the drive-side permanent magnet, the system further has an advantage.

With the electric power converter, electric power converter controlling method and electric power converting system according to the invention, it is possible to bring the input power factor command to the output condition thereof, to appropriately control the input power factor when the output side of the system is rotated at high speed, and to drive the motor in the high speed range. Therefore, it is capable of being utilized in a hybrid electric power converting system using such an electric power converter, an electric vehicle system, and a matrix converter system employing a three-phase AC generator.

Also, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A control unit for controlling an electric power converter, the electric power converter converting multi-phase alternating current inputted from a generator and supplying the converted current to a motor, the control unit comprising:
    an input power factor commanding section operable to output an input power factor command value for an input power factor of the generator according to an operating condition of the motor; and
    an input power factor controlling section operable to output a control signal to the electric power converter, the control signal for controlling the input power factor and based on the input power factor command value wherein the control signal includes an ON/OFF signal output to each of a first switch connecting R-phase and U-phase of the electric power converter, a second switch connecting S-phase and the U-phase of the electric power converter, a third switch connecting T-phase and the U-phase of the electric power converter, a fourth switch connecting the R-phase and V-phase of the electric power converter, a fifth switch connecting S-phase and the V-phase of the electric power converter, a sixth switch connecting the T-phase and the V-phase of the electric power converter, a seventh switch connecting the R-phase and W-phase of the electric power converter, an eighth switch connecting the R-phase and the W-phase of the electric power converter, and a ninth switch connecting the T-phase and the W-phase of the electric power converter.

2. The control unit according to claim 1 wherein the input power factor commanding section is further operable to calculate the input power factor command value according to a required voltage of the motor, the required voltage being based on an output torque command value of the motor and an output rotation angular speed of the motor.

3. A control unit according to claim 2 wherein the input power factor commanding section is further operable to apply the required voltage and to calculate the input power factor of minimizing the input current as the command value.

4. A control unit according to claim 1 wherein the input power factor controlling section is further operable to generate a drive voltage command to satisfy an output voltage command of the motor by synthesizing output voltages of two virtual direct current voltage sources, which correspond to a respective instantaneous input voltage value of an input voltage of the multi-phase alternating current from the generator; and wherein the input power factor controlling section is further operable to control the input power factor by varying a voltage distribution ratio of the two virtual direct current voltage sources.

5. A control unit according to claim 4 wherein the input power factor controlling section further comprises:
    an input voltage determining section operable to generate the respective input voltage value and a mode signal indicative of a condition of the input voltage based on a magnitude relation of the input voltage values;
    an output voltage calculating section operable to calculate the output voltage command based on an output torque command value of the motor and an output rotation angular speed of the motor;
    a virtual PWM signal generating section operable to generate a virtual PWM signal of a switch when a drive voltage satisfies the output voltage command by generating and synthesizing a pulse by a predetermined voltage distribution ratio between respective output voltages of the two virtual direct-current voltage sources;
    a voltage distribution ratio calculating section operable to calculate a voltage distribution ratio from the input voltage and the input power factor command value; and
    a signal synthesizing section operable to generate the control signal wherein the control signal is a synthesized PWM signal from the mode signal and the virtual PWM signal.

6. The control unit according to claim 5 wherein the virtual PWM signal generating section further comprises:
    a voltage command value calculating section operable to generate a voltage command value of each respective input voltage value based on a product of the output voltage command and the voltage distribution ratio; and
    a regulated voltage commanding section operable to generate a regulated voltage command obtained by regulating the voltage command value of each respective input voltage value with respect to the corresponding input voltage; and wherein the virtual PWM signal generating section is further operable to generate the virtual PWM signal by executing a triangular wave comparison PWM control of the regulated voltage command.

7. The control unit according to claim 6 wherein the signal synthesizing section further comprises a map representing a relationship between the virtual PWM signal and the mode signal.

8. The control unit according to claim 1 wherein the input power factor commanding section further comprises:
    a coordinate converting section operable to generate a conversion current by executing a coordinate conversion of the input current;

a conversion current command calculating section operable to generate a conversion current command value; and a compensating section operable to adjust the input power factor command value based on a difference between the conversion current and the conversion current command value.

9. The control unit according to claim 8 wherein the conversion current command calculating section is further operable to generate the conversion current command value based on a product of an amplitude of the input current and a trigonometric function of the power factor command value.

10. The control unit according to claim 1 wherein the input power factor commanding section further comprises:
a coordinate converting section operable to generate a conversion current by executing a coordinate conversion of the input current;
a conversion current command calculating section operable to generate a conversion current command value;
a compensating section operable to calculate an adjustment value for the input power factor command value on the basis of a difference between the conversion current and the conversion current command value; and
a correcting section operable to correct the input power factor command value based on a sum of the input power factor command value and the adjustment value.

11. An electric power converting system comprising:
a generator operable to generate multi-phase alternating current;
a motor driven by the multi-phase alternating current;
an electric power converter connected to the generator and the motor; and
a control unit for controlling the electric power converter, the control unit including:
an input power factor commanding section operable to generate an input power factor command value for an input power factor of the generator, the input power factor command value based on an operating condition of the motor; and
an input power factor controlling section operable to output a control signal to the electric power converter for controlling the input power factor based on the input power factor command value wherein the input power factor controlling section further comprises:
an input voltage determining section operable to generate an input voltage value and a mode signal based on a voltage of the multi-phase alternating current from the generator;
an output voltage calculating section operable to calculate an output voltage command value based on an output torque command value and an output rotation angular speed of the motor;
a voltage distribution ratio calculating section operable to calculate a voltage distribution ratio based on the input voltage value and the input power factor command value;
a virtual PWM signal generating section operable to generate a virtual PWM signal for each of two virtual direct current voltage sources based on the voltage distribution ratio; and
a signal synthesizing section operable to generate the control signal as a synthesized PWM signal based on the mode signal and the virtual PWM signals.

12. The electric power converting system according to claim 11 wherein the input power factor commanding section is further operable to calculate the input power factor command value according to a required voltage of the motor.

13. The electric power converting system according to claim 11 wherein the input power factor controlling section is further operable to apply the required voltage by minimizing the input current in response to the input power factor command value.

14. The electric power converting system according to claim 11 wherein the input power factor commanding section further comprises:
a coordinate converting section operable to generate a conversion current by executing a coordinate conversion of the input current;
a conversion current command calculating section operable to generate a conversion current command value; and
a compensating section operable to adjust the input power factor command value based on a difference between the conversion current and the conversion current command value.

15. A method for controlling an electric power converter, wherein the electric power converter receives multi-phase alternating current input current from a generator and supplies converted output current to a motor, the method comprising:
determining an input power factor command value for the input power factor of the generator, the input power factor command value based on an operating condition of the motor;
outputting a control signal to the electric power converter for controlling the input power factor of the generator based on the input power factor command value
generating a conversion current by executing a coordinate conversion of the input current from the generator;
generating a conversion current command value;
calculating an adjustment value for the input power factor command value based on a difference between the conversion current and the conversion current command value; and
correcting the input power factor command value based on a sum of the input power factor command value and the adjustment value.

16. The method according to claim 15 wherein determining an input power factor command value further comprises:
calculating the input power factor command value according to a required voltage of the motor, the required voltage being based on an output torque command value of the motor and an output rotation angular speed of the motor.

17. A method according to claim 15 wherein the input power factor commanding section is further operable to apply the required voltage and to calculate the input power factor of minimizing the input current as the command value.

* * * * *